United States Patent [19]

Foster et al.

[11] 4,366,578
[45] Dec. 28, 1982

[54] TRANSMIT/RECEIVE MODE PROTECTION ARRANGEMENT

[75] Inventors: George B. Foster; David E. Harris, both of Columbus, Ohio

[73] Assignee: Foster Airdata Systems Inc., Columbus, Ohio

[21] Appl. No.: 235,990

[22] Filed: Feb. 19, 1981

[51] Int. Cl.³ .............................................. H04B 1/46
[52] U.S. Cl. .................................. 455/79; 179/1 VC
[58] Field of Search ....................... 455/78, 79, 80, 82, 455/89; 179/1 VC, 1 HF

[56] References Cited

U.S. PATENT DOCUMENTS 3,500,459  3/1970  Battin et al. .
4,119,797 10/1978  Wollert ............................ 179/1 HF

FOREIGN PATENT DOCUMENTS 474116  1/1976  U.S.S.R. ........................ 179/1 VC

*Primary Examiner*—Marc E. Bookbinder
*Attorney, Agent, or Firm*—Cushman, Darby & Cushman

[57] ABSTRACT

An arrangement for preventing inadvertent transmission by a push-to-talk transceiver that might join a communications channel. After the push-to-talk switch has been activated, an average background noise level is established. Audio from speech, for example, having peaks greater than a predetermined percentage of the average background noise level are required to maintain the push-to-talk function activated.

7 Claims, 2 Drawing Figures

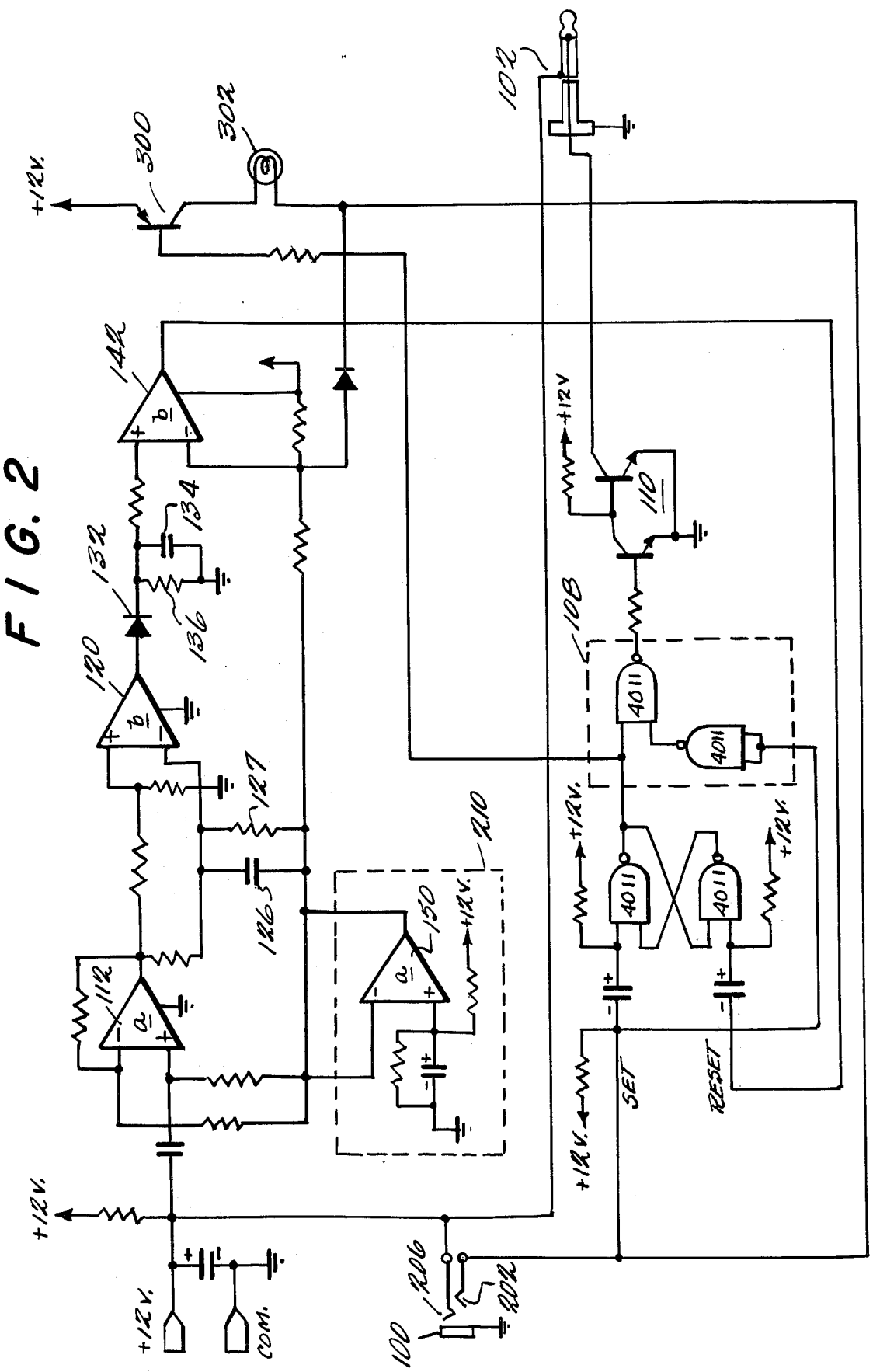

TRANSMIT/RECEIVE MODE PROTECTION ARRANGEMENT

BACKGROUND OF THE INVENTION

This invention relates to communication stations, such as radio communication transceivers, employing a "push-to-talk" switch. A radio transceiver capable of transmitting and receiving and having a push-to-talk switch, usually physically associated with a microphone element or near the operator's hands, normally operates in the receive mode. To transmit, an operator presses the push-to-talk switch. Pressing the push-to-talk switch usually operates a relay within the transceiver that causes it to operate in the transmit mode. When the operator releases the push-to-talk switch, the transceiver reverts to receive mode operation.

In communication networks wherein a plurality of such transceivers communicate with one another over a limited number of communication channels, any one transceiver that continuously transmits may tie up the network and prevent others from communicating thereon. Such continuous transmission by a communication station within a public service or safety network such as police, fire, airline control, and utilities, can create a safety hazard.

It is possible for such continuous transmission to occur without the knowledge of the communication station operator. This can occur when the push-to-talk switch, becomes stuck.

In an airline communication network, this can and does occur on occasion when pilots utilize a communication radio having a handheld microphone with a push-to-talk switch mounted directly on the microphone. Such a microphone, laid upon the seat, within reach of the pilot, can slip between the seats and become lodged between the seats or mechanical equipment and the push-to-talk switch may become pressed without knowledge of the pilot. If the radio is squelched to eliminate the "drone" of background noise when operating in the receive mode, the pilot can transmit without realizing that transmission is occurring. If his signal is sufficiently powerful, he can, in effect, jam communications on the channel on which he is transmitting and prevent others from communicating important messages including clearances, runway approaches, wind velocities and the like.

One approach to obviating the safety problem associated with a stuck push-to-talk switch is to provide means for limiting the time permitted for each transmission i.e. inhibit further transmission after a predetermined period of time has lapsed. One embodiment of this approach is shown in U.S. Pat. No. 3,500,459—Battin et al., issued Mar. 10, 1970. In the Battin arrangement, a timer is provided for establishing a predetermined maximum period of time for each transmission. The pressing of the push-to-talk switch, in effect, sets the timer which begins to count time during the transmission. When the timer times out, if the push-to-talk switch has not been released, means, coupled to the timer, electrically disengage a relay associated with the push-to-talk switch. Thus, the radio station is "forced" back into the receive mode, even with the push-to-talk switch continuously pressed. Thus, in effect, the push-to-talk switch is defeated. The difficulty associated with this approach is that every transmission must be limited to a predetermined interval of time. In the event that a more lengthy communication is required, the operator must periodically re-key his push to talk switch. During an emergency wherein the operator's attention must be directed fully to the emergency and the substance of communication, the required re-keying of the push-to-talk switch provides a distraction that, in and of itself, contributes to the emergency by diverting the operator's full attention.

SUMMARY OF THE INVENTION

In order to overcome the problem of the "stuck mic" button while avoiding the operating disadvantage associated with a timing arrangement, as discussed above, the present invention provides protection from a stuck push-to-talk switch that is based upon audio or sound signals rather than a predefined time window. In essence, the present invention provides a transmit/receive mode protection arrangement that establishes an average background noise level indicative, for example, of the background noise within the cabin of an aircraft by "listening" to the sounds picked up by the microphone element. Sound levels established by the speech of the communication operator (for example, the pilot of an aircraft) are compared with the average background noise level.

After the communication operator has pressed the push-to-talk switch in order to obtain transmit mode operation, transmit mode operation will continue as long as someone is speaking into the microphone thereby maintaining the existing audio signal level (or a predetermined fraction thereof) above the average background level previously established. However, in the event that the current audio level (or a predetermined fraction thereof) drop below a point slightly above the average audio signal level for more than a predetermined time, then the transceiver will automatically revert to receive mode operation regardless of continued pressure on the push-to-talk switch. Even though there is a timing element associated with the protection arrangement, it is primarily triggered by a comparison of sound levels and does not depend solely on a timing function. Thus, in an emergency situation requiring a lengthy speech by a communication operator, he can maintain pressure on the push-to-talk switch and speak as long as necessary without interruption. In the event that the microphone falls and becomes lodged, for example, between the seats of an aircraft, such that the communication station operates in the transmit mode, the arrangement notes the absence of speech into the microphone exceeding the average noise level established and automatically inhibits further transmission by switching the transceiver to the receive mode. Once this reset to the receive mode has occurred, in order to transmit again, the operator must un-key the push-to-talk switch and press it again.

The operational advantage of this system is that even a high steady sound level will not cause transmission to continue in the stuck push-to-talk switch situation. This is because the high steady sound level will merely establish a high average background noise level that must be exceeded by the operator's speech in order for transmission to continue. Thus, such high steady sound levels as aircraft engine noise, police sirens, etc., will not inhibit the protection afforded by the present invention. Regardless of the average sound level established, audio peaks from speech in excess of a predetermined percentage above that average level would be required to prevent a timing out inhibiting further transmission.

The arrangement according to the present invention, is suitable for fabrication as a "plug-in" or "add-on" unit for coupling between a conventional microphone having both a microphone element and a push-to-talk switch for controlling transmit/receive mode operation and the communications equipment into which the conventional microphone is plugged. The protection arrangement of the present invention couples the audio electrical signal directly from the microphone element to the communication equipment while it simultaneously controls transmit/receive mode operation.

In an alternative embodiment, the transmit/receive mode protection arrangement of the present invention can be fabricated not as a "plug-in" or "add-on" device for coupling the microphone to the communication equipment, but rather as part of the communication equipment itself.

In another alternate embodiment, the decision making components of the transmit/receive mode protection arrangement of the present invention could be fabricated as an add-on module for use with a communication station. The module would receive an audio signal generated by the microphone element, a key signal from the push-to-talk switch and power. It would, in turn, provide a "disable" key function to the communication station as necessary to "un-key" a stuck push-to-talk switch.

In addition, further embodiments of the present invention, could include annunciators such as lights or sound alarms, or both, for indicating when the disable function is activated.

The preferred embodiment of the transmit/receive mode protection arrangement includes an audio preamplifier for amplifying the audio signal from the microphone element. The output of the audio amplifier is coupled through a diode to a capacitor which charges to a signal level associated with an average audio signal from the preamplifier. The capacitor is coupled to the inverting input of a comparator and the output of the preamplifier is coupled through a resistive divider to the non-inverting input of the comparator. The comparator compares a predetermined percentage of the audio signal from the preamplifier with the average level. Whenever the predetermined percentage of audio signal is greater than the average level established on the capacitor, the comparator provides a positive comparator signal. This comparator signal is diode coupled to a second capacitor which charges in accordance with the comparator signal. The signal on this second capacitor is compared with a predetermined reference level established by a resistive divider. Associated with the capacitor is a resistor coupled so as to discharge the capacitor with a predetermined time constant. Thus, when the charge on the second capacitor decays to a magnitude less than the predetermined reference level established by the resistive divider, a timing comparator signal is generated.

The push-to-talk switch is coupled to the set input of a flip-flop and also to one input of an AND gate. The timing comparator signal is coupled to the reset input of the flip-flop. The output of the flip-flop is coupled to the second input of the AND gate. The output of the AND gate is coupled to a transistor switch stage which controls the transmit/receive mode of the transceiver. Thus, the pressing of the push-to-talk switch sets the flip-flop causing, in turn an output from the AND gate. The AND gate causes the transceiver to operate in the transmit mode. Either releasing the push-to-talk switch or a reset signal from the timing comparator causing the flip-flop to reset will eliminate one of the two required inputs to the AND gate thereby causing the transceiver to operate in the receive mode. Thus, a reset is provided when the current audio level or a predetermined fraction thereof, falls below the average signal level established by the first capacitor.

BRIEF DESCRIPTION OF THE DRAWINGS

This invention will be better understood by the following detailed description and appended claims read with reference to the drawings wherein:

FIG. 2 is a schematic diagram of a second embodiment of the transmit/receive mode protection arrangement according to the present invention.

DETAILED DESCRIPTION OF THE PREFERRED EMBODIMENT

Figure 1:
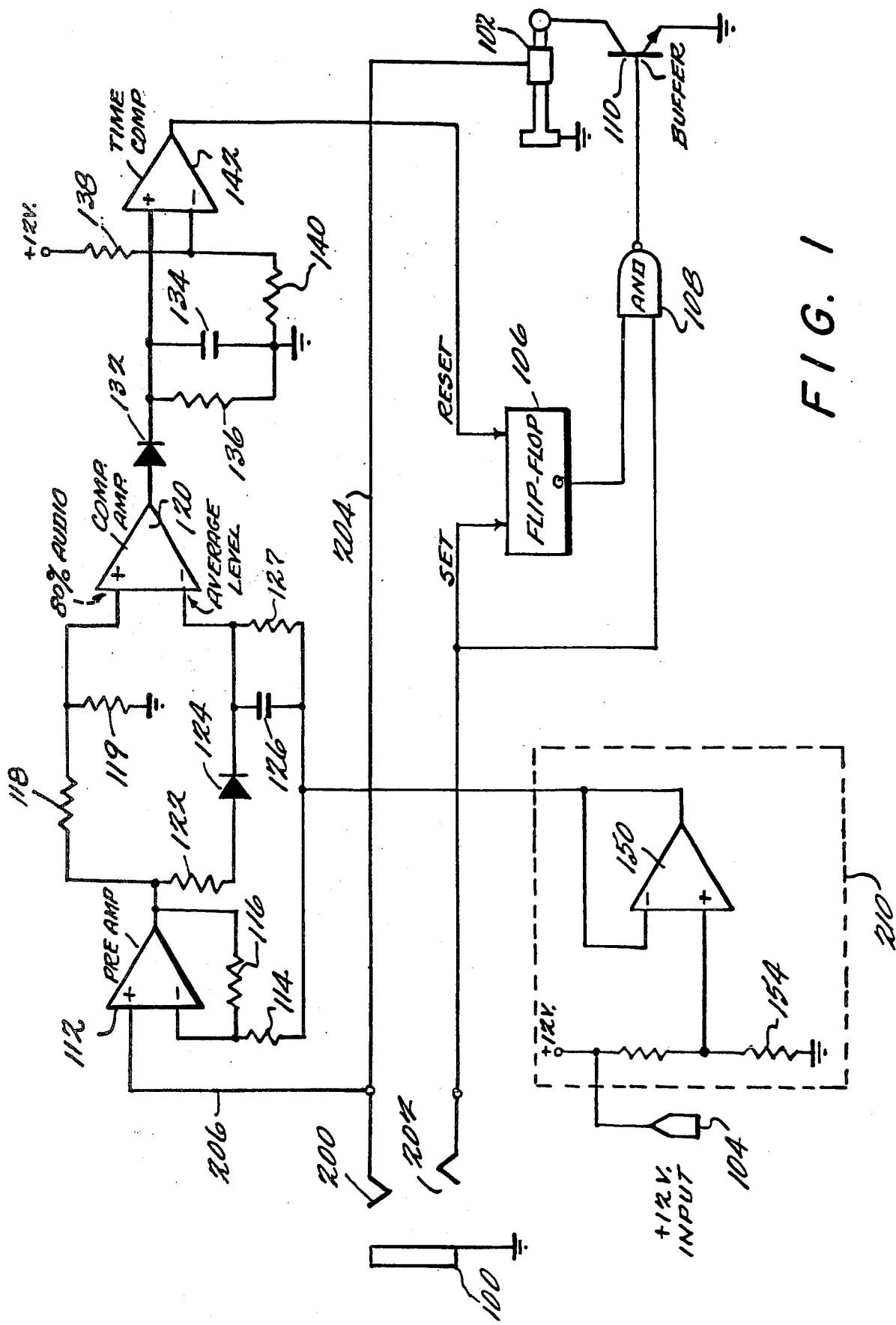
FIG. 1 is a schematic diagram of a first embodiment of the transmit/receive mode protection arrangement according to the present invention.

Referring now to FIG. 1 there is shown a detailed schematic diagram of the preferred embodiment of the transmit/receive mode protection arrangement according to the present invention. As shown in this Figure, this embodiment represents a plug-in or "add-on" device for use with a communication transceiver for preventing a stuck push-to-talk switch from inadvertently causing the transceiver to transmit for an extended period of time. The transmit/receive mode protection arrangement is intended for use with transceivers having a plug-in microphone including a microphone element and a push-to-talk switch, causing the transceiver to operate in the transmit mode when pressed. When using the protection arrangement, instead of plugging the microphone directly into the microphone jack of the transceiver in the normal fashion, the microphone would instead be plugged into an input jack 100 of the arrangement.

Input jack 100 includes a pin 200 for receving the microphone element audio signal and a push-to-talk switch 202 for keying the transmitter into the transmit mode from its normally operational receive mode. The arrangement also includes a plug 102 for coupling to the transceiver in place of the microphone normally plugged therein. Thus, the transmit/receive mode protection arrangement is truly an add-on, plug compatible modification easily added to a communication transceiver for adding "stuck-mic" protection. Power lines can be provided to derive power from the communication transceiver or from an additional power source. For example, a power input terminal 104 is provided for drawing current from a vehicle battery for powering the protection arrangement.

Push-to-talk switch 202 is coupled to the set input of a set-reset flip-flop 106 having set and reset inputs and a Q output. When an operator presses push-to-talk switch 202, a pulse is generated at the set input of flip-flop 106 causing its Q-output to assume a logic level high state. The Q-output of flip-flop 106 is coupled to a first input of an AND gate 108. A second input of AND gate 108 is coupled directly to push-to-talk switch 202 so as to receive the same signal coupled to the set input of flip-flop 106. Thus, if push-to-talk switch 202 is pressed and if flip-flop 106 is set, AND gate 108 will provide a logic level high state at an output thereof. The output of AND gate 108 is coupled to a buffer transistor 110 which, in essence, operates as a switch. This switch effectively grounds the transceivers transmit/receive relay through plug 102 in order to place the transceiver in the transmit mode when there is a logic level high signal from AND gate 108. AND gate 108 requires that both inputs thereto remain high in order to maintain operation in the transmit mode.

If push-to-talk switch 202 were released after being pressed, the second input to AND gate 108 would go to a logic level low state and switch the transceiver back to the receive mode through buffer transistor 110 and plug 102. However, it is also possible to switch to the receive mode by resetting flip flop 106. Resetting flip-flop 106 would cause the first input of AND gate 108 to go to a logic level low state and thereby remove the logic level low state and thereby remove the logic level high signal at the output thereof. Such action would effectively cut off buffer transistor 110 as if push-to-talk switch 202 had been released by the operator.

The reset input of flip-flop 106 is coupled to an automatic shutdown portion of the arrangement responsive to the audio signals sent by a microphone element coupled to terminal 200 of input jack 100. Microphone signals are coupled directly from input jack 100 to output plug 102 via a signal line 204 coupling terminal 200 to a corresponding terminal of plug 102. In addition, a signal line 206 couples the microphone signal from terminal 200 to the non-inverting input of an audio preamplifier 112. Audio preamplifier 112 increases the electrical signal from the microphone element to a level of approximately 5 to 10 volts peak-to-peak. The gain of audio preamplifier 112 necessary to reach this peak-to-peak level depends upon the type of microphone coupled to terminal 200 of input jack 100 and the ratio of resistors 116 to 114 in the circuit of audio preamplifier. The output of audio preamplifier 112 is coupled through a voltage divider including resistors 118 and 119 where it is attentuated by 20% into the non-inverting input of a comparator amplifier 120. The output of audio preamplifier 112 is also coupled through a resistor 122 and a diode 124 to a capacitor 126. Diode 124 passes only the positive portions of the signal from audio preamplifier 112 and resistor 122 limits the current through diode 124. Capacitor 126 charges up to some positive voltage that is proportional to the average audio signal level corresponding to the electrical output signal of audio preamplifier 112. Capacitor 126 is coupled to the inverting input of comparaor amplifier 120. In addition, comparator amplifier 120 is biased at its inverting input by a reference source 210. In essence, the electrical signal corresponding to the average audio signal is referenced to this reference source.

Reference source 210 includes a voltage divider including resistors 152 and 154 coupled to power input terminal 104. The divided voltage from this divider is coupled to the non-inverting input of a voltage divider amplifier 150. In essence, voltage divider amplifier 150 is an operational amplifier having an output coupled directly to the inverting input thereof in a voltage follower configuration. The output of voltage dividing amplifier 150 is coupled to the reference side of capacitor 126 and is also coupled through a resistor 127 to the inverting input of comparator amplifier 120.

As stated, capacitor 126 charges up to some positive voltage that is proportional to the average audio signal level sent by the microphone element. The output of comparator amplifier 120 remains low i.e. near zero volts until the peak audio level represented by the signal on its non-inverting input exceeds the average level represented by the signal at its inverting input by the percentage determined by resistors 118 and 119. When a peak signal level exceeds the average by that percentage defined by resistors 118 and 119, the output of comparator amplifier 120 goes high, i.e. approximately 12 volts when using a 12 volt source coupled to terminal 104.

The 12 volt signal from the output of comparator amplifier 120 is coupled through a diode 132 to a capacitor 134, charging it to approximately 12 volts. Capacitor 134 charges to approximately 12 volts every time the audio peak exceeds the average by 20% or whatever percentage is selected in the alternative by the ratio of resistors 118 and 119. A resistor 136 is coupled in parallel with the capacitor 134 to establish a time constant for discharging the capacitor. Typically, this time constant will be established such that it takes approximately 8 to 10 seconds for capacitor 134 to discharge below a predetermined voltage point determined by a resistive divider including resistors 138 and 140.

When the voltage on capacitor 134 reaches this predetermined point, the non-inverting input of a timer comparator 142 will be lower than the voltage at its inverting input. This condition causes a pulse to occur at the output of timer comparator 142. The output of timer comparator 142 is coupled to the reset input of flip-flop 106. Thus, whenever capacitor 134 is allowed to discharge below the predetermined point established by resistors 138 and 140, a pulse will be coupled from the output of timer comparator 142 to the reset input of flipflop 106 thereby causing the flip-flop to reset. The resetting of flip-flop 106 causes the output of AND gate 108 to go to a logic level low state which in turn causes buffer transistor 110 to open. This in turn causes the transceiver to operate in the receive mode regardless of the state of closure of push-to-talk switch 202. The only way to resume transmit mode operation would be to release the push-to-talk switch 202 and then close it again to create a set condition of flip-flop 106.

A high but steady sound level into the microphone element such as aircraft engine noise, police sirens, etc. into the microphone element will not continue to trigger comparator amplifier 120. Such high steady mechanical noises will cause capacitor 126 to charge to high average level. However, comparator amplifier 120 will require peaks 20% (or any other value selected by the ratio of the resistors 118 and 119) above the average level to trigger and reset timer comparator 142 before it times out. The interval of time that the audio signal is averaged is set by the time constant of capacitor 126 and its associated resistor 127. This time constant can be adjusted to reject a more irregular background noise if necessary. In the case of 12 volt operation, as shown in this Figure, reference source 210 supplies a 50% (6 volt) voltage reference for audio preamplifier 112 and comparator amplifier 120. The output of voltage divider amplifier 150 determines the discharge point of capacitor 126 with no audio present so that the noise present on the audio line when the push-to-talk switch 202 is pressed is sufficient to cause the first audio signal peak above average and thereby set timer comparator 142 so as to begin transmission in the transmit mode. A more detailed schematic of this embodiment is shown in FIG. 2.

Referring now to FIG. 2 there is shown a more detailed schematic diagram of the embodiment shown in FIG. 1. This schematic diagram illustrates a practical implementation of the circuit previously detailed. In this embodiment, a first operational amplifier package (a) performs the function of voltage divider amplifier 150 and audio preamplifier 112. A second operational amplifier package (b) performs the function of comparator amplifier 120 and timer comparator 142. A 4011 CMOS AND- gate package performs the function of flip-flop 106 and AND gate 108. Two transistors including a 2N2369 and a 2N2219 perform the function of buffer transistor 110. Also included in this practical implementation is an additional transistor 300 and a lamp indicator 302 indicating the operating mode of the transceiver. Indicator 302, in essence, alerts the operator as to a stuck mic condition.

Of course, other alternatives and embodiments will be apparent to one of ordinary skill in the art having the benefit of the teachings presented in this patent. For example, one could include potentiometers in place of fixed resistors for setting average audio levels and the time constant for decay of capacitor 134. In addition, variable gains may be provided for audio preamplifier 112 for use with different types of microphones. Also, circuitry could be provided to accommodate different power supply voltages. Therefore, it is understood that such alternatives and embodiments are to be included within the scope of the appended claims.

We claim:

1. An apparatus for controlling the transmit/receive operation of a communications station having a microphone element for generating a modulating signal during transmission by said communications station and a transmit/receive mode switch for selecting transmit or receive mode operation, comprising:

first means for activating transmit mode operation of said communications station in response to the actuation of said transmit/receive mode switch to a transmit position thereof;

second means for establishing an average background signal level from audio signals derived from said microphone element;

third means connected to said first and second means, said third means including means for (a) comparing an existing level of audio signal from said microphone element with the average background signal level established by said second means and (b) causing said first means of the communications station to operate in the receive mode even with the transmit/receive mode switch in the transmit position upon detecting a predetermined result of said comparison for a predetermined time interval.

2. An apparatus according to claim 1 wherein said third means causes operation in the receive mode upon detecting the lapsing of a predetermined interval of time following a drop of level of said existing audio level below a predetermined level established with respect to said average background signal level.

3. An apparatus according to claim 1 further comprising fourth means, responsive to a switching of said switch from its transmit position to its receive position and thereafter to a switching of said switch back to its transmit position, for activating said first means to again cause transmit mode operation.

4. A transmit/receive mode control apparatus for a communication station having a microphone element for generating an audio signal for modulating the transmissions of said communication station and a "push-to-talk" switch for keying said station into the transmit mode whenever said switch is pressed, comprising:

an audio amplifier for amplifying audio signals derived from said microphone element;

averaging means, coupled to said audio amplifier, for establishing a signal indicative of an average audio level derived from said amplifier;

first comparator means, coupled to both said audio amplifier and to said averaging means, for comparing the current audio signal level or a predetermined fraction thereof, with the average audio level derived from said averaging means and generating a first comparator signal whenever the current audio signal level, or predetermined fraction thereof exceeds the average audio signal level established by said averaging means;

memory circuit means having a predetermined decay time constant associated therewith, coupled to said first comparator means, for memorizing the output signal level of said first comparator means and allowing said signal to decay in accordance with said time constant;

second comparator means for comparing the decaying signal from said memory circuit means with a predetermined reference level and providing a reset signal whenever said decaying signal falls below said predetermined reference level;

mode control means, coupled to said push-to-talk switch and to said second comparator means for setting said communication station (a) in the transmit mode responsive to the pressing of said push-to-talk switch, (b) in the receive mode responsive to the continued pressing of the push-to-talk switch and the presence of a reset signal, and (c) in the receive mode responsive to the release of the push-to-talk switch regardless of the presence or absence of a reset signal.

5. An apparatus according to claim 4 wherein said mode control means comprises:

a flip-flop element having a set input coupled to said push-to-talk switch and a reset input adapted to receive said reset signal and an output line, whereby said flip-flop element is set responsive to the pressing of said push-to-talk switch and reset responsive to said reset signal;

an AND gate having a first input coupled to said push-to-talk switch and a second input coupled to the output of said flip-flop element providing at an output thereof a signal only when both the push-to-talk switch is pressed and the flip-flop element is set; and means coupled to said AND gate, for keying said communication station into the transmit mode responsive to an output signal from said AND gate, whereby said communication station, keyed into the transmit mode by the pressing of said push-to-talk switch, is reset into the receive mode after a predetermined elapsed time interval whenever the current audio signal level, or a predetermined fraction thereof, falls below the average audio level established by said averaging means.

6. An apparatus intended for coupling a microphone element having an associated "push-to-talk" switch to a communication station operable in a transmit or receive mode, the transmit mode normally being called for by the pressing of the push-to-talk switch, said apparatus for restoring the communication station to receive mode operation in the event that the push-to-talk switch remains pressed for an extended period of time in the absence of speech into said microphone element, comprising:

averaging means coupled to said microphone element for establishing an average audio level;

first comparator means for comparing a current audio level with the average level established by said averaging means and providing a signal whenever the current level or a predetermined fraction thereof, exceeds the average level;

timing comparator means, coupled to said first comparator means, for providing a reset signal whenever the current level or a predetermined fraction thereof exceeds the average level and then fails to exceed the average level for a predetermined period of time;

mode control means, coupled to said push-to-talk switch and adapted to receive said reset signal, for setting said communication station (a) in the transmit mode responsive to the pressing of said push-to-talk switch, (b) in the receive mode responsive to the continued pressing of the push-to-talk switch and the presence of a reset signal, and (c) in the receive mode responsive to the release of the push-to-talk switch regardless of the presence or absence of a reset signal.

7. An apparatus according to claim 6 wherein said mode control means comprises:

a flip-flop element having a set input coupled to said push-to-talk switch and a reset input adapted to receive said reset signal and an output line, whereby said flip-flop element is set responsive to the pressing of said push-to-talk switch and reset responsive to said reset signal;

an AND gate having a first input coupled to said push-to-talk switch and a second input coupled to the output of said flip-flop element providing at an output thereof a signal only when both the push-to-talk switch is pressed and the flip-flop element is set; and means coupled to said AND gate, for keying said communication station into the transmit mode responsive to an output signal from said AND gate, whereby said communication station, keyed into the transmit mode by the pressing of said push-to-talk switch, is reset into the receive mode after a predetermined elapsed time interval whenever the current audio signal level, or a predetermined fraction thereof, falls below the average audio level established by said averaging means.

* * * * *